Aug. 17, 1948.　　　　F. P. HEALY　　　　2,447,334
CRANK SHAFT REGRINDING CHUCK
Filed Dec. 22, 1945
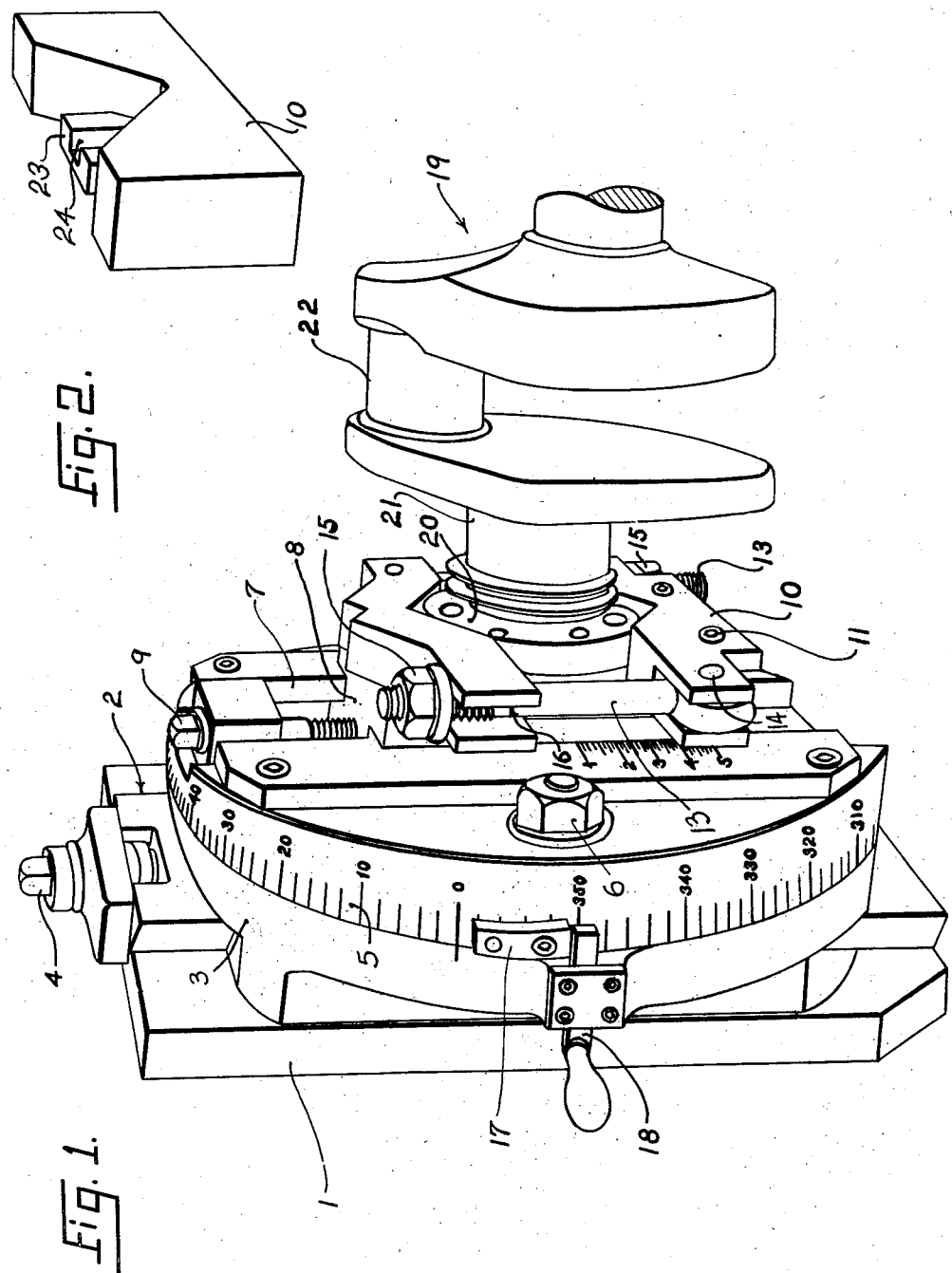
INVENTOR
FRANCIS P. HEALY
BY Chapin & Neal
ATTORNEYS Patented Aug. 17, 1948

2,447,334

UNITED STATES PATENT OFFICE 2,447,334

CRANKSHAFT REGRINDING CHUCK

Francis P. Healy, Springfield, Mass., assignor to Van Norman Company, Springfield, Mass., a corporation of Massachusetts Application December 22, 1945, Serial No. 636,980

2 Claims. (Cl. 51—237)

This invention relates to chucks or work holders for supporting crank shafts for regrinding.

It has been customary in regrinding crank shafts to mount them on lathe centers fitting in centering holes at the ends of the shaft. Such holes are not always concentric with the bearing surfaces, particularly since these surfaces are frequently finished by centerless grinding rather than on centers. It has also been proposed to grip the ends of the shaft in chucks, but chucks seldom give accurate centralization. In both methods it has been proposed to shift the centers or chucks laterally and to rotate the shaft with respect to them, so that the pin bearings may be brought into alignment with the axis of rotation of the work head.

All of these prior devices have been subject to inaccuracies or to difficulties in manipulation which are avoided by my improved mounting. In accordance with my invention the headstock is provided with a face plate on which is a transverse slide. A rotatably adjustable head is mounted on this slide and provided with clamping means for holding it in any desired angular adjustment. The axis of rotation of this head is located on the main slide so as to be movable by the latter in a plane including the axis of rotation of the faceplate. A second transverse slide, parallel to the first, is mounted on this head and has a V-block fixed to it. A second V-block is attached to the first by adjustable hinge and clamp mechanism. The V-blocks hold any cylindrical surface at the end of the shaft, such as the flange by which the crankshaft is secured to the flywheel, and keep it centralized laterally of the slides. By adjusting the second slide, with the first set for zero eccentricity, the axis of the main bearings can be made concentric with the spindle of the machine. The eccentricity necessary to bring the pins into grinding position can then be secured by adjusting the main slide and the various sets of pins shifted to grinding position all without loosening the hold of the V-blocks on the shaft.

In the drawing Fig. 1 is a perspective view of a work holder constructed in accordance with the invention, and Fig. 2 is a detail thereof.

Referring to the drawing, 1 is a face plate which is to be secured in any desired way to the head or tail stock spindle of a grinding machine. Ways 2 are provided on this face plate for the reception of a main slide 3, which may be adjusted by a screw 4 held against axial motion in the face plate and threaded into the main slide. Upon the main slide a head 5 is rotatably mounted and held in adjusted position by bolts 6 which pass as usual into arcuate slots in the slide 3. The axis of rotation of this head is so located on the main slide as to be shiftable parallel to, and in a plane including, the axis of rotation of the face plate.

On the head 5 are ways 7 in which an auxiliary slide 8 runs, which is adjustable by a screw 9 held against longitudinal movement in the head and threaded into the slide. A V-block 10 is secured to the auxiliary slide as by screws 11, and a second V-block 12 is secured to the first as by oppositely facing bolts 13 pivoted to the respective blocks at 14 and having adjusting nuts 15 by which the spacing of the blocks from each other can be varied. These V-blocks are so located that a plane bisecting their angles is parallel to and includes the axis of rotation of the head, so that the shaft clamped between them may be shifted by the slide into exact coincidence with said axis. At least one of the blocks, as 12, may conveniently be slotted at 16 to permit the bolt to be swung outwardly to free the block for tilting on its pivot to permit the work to be inserted or removed. The slides and the head are preferably provided with graduations to facilitate adjustment, and the head provided with a stop 17 cooperating with a slidable abutment 18 to assist in returning the slide to its zero setting.

A crank shaft 19 is shown with its fly wheel flange 20 held between the V-blocks. The latter are adjusted so that they lie parallel to avoid lateral displacement of the axis of the main bearing 21 of the shaft, and the clamping bolts are tightened. The auxiliary slide is then shifted roughly by the graduations in accordance with the diameter of the surface being grasped, and is then adjusted accurately with an indicator applied to the main bearings so that their surfaces run true. The same operation is then performed with the work holder on the other spindle of the grinding machine, which may be holding a surface of different diameter. The main bearings are then aligned with the axes of the spindles and may be ground to the desired size.

Generally the fly wheel flange of a crank shaft is provided with a projecting dowel to insure correct angular relationship to the flywheel. In such cases it is preferable to provide the V-block 10 with a member 23 having a slot 24 into which the dowel may fit to register the crank shaft in definite relation to the work holder and to prevent any possibility of slipping.

To grind the crank pins 22 the main slide is shifted a distance corresponding to the throw of the cranks, either by scale or by an indicator applied to one of the main bearing surfaces. By rotating the head 5 the various sets of crank pins can then be brought successively into alignment with the axis of the machine spindles for grinding. It will be observed that the accuracy of the work is not dependent upon the accuracy of any centers at the ends of the shaft, and that the crank shaft remains clamped firmly during all operations; whereas in former work holders the shaft was rotated around these center bores, had to be shifted around in a clamp during the work, or was dependent upon the accuracy of chucking means for centralizing it.

I claim:

1. A work holder for crank shafts comprising a face plate rotatable around an axis, a main slide adjustable on the face plate in a plane intersecting the axis of the face plate at right angles, a head rotatably mounted upon an axis parallel to, and movable by the main slide in a plane including, the axis of the face plate, an auxiliary slide mounted on the head for radial movement thereon, means for adjusting and holding in adjusted position said auxiliary slide, a V-block fixed to the auxiliary slide, and a second V-block on the auxiliary slide adjustably spaced from the first, the plane bisecting the angles of the V's being parallel to the path of motion of the auxiliary slide and including the axis of rotation of the head; whereby, with a main bearing of a crankshaft clamped between the V-blocks, the auxiliary slide can be shifted to bring the axis of said bearing into alignment with the axes of rotation of the head and face plate, the main slide can thereupon be adjusted to space the axis of the main bearing from the axis of the face plate a distance corresponding to the throw of the crank pin bearings, and the crank pin bearings can be brought successively into alignment with the axis of the face plate, all without releasing the main bearing from the V-blocks.

2. A work holder for crank shafts comprising a face plate rotatable around an axis, a main slide adjustable on the face plate in a plane intersecting the axis of the face plate at right angles, a head rotatably mounted upon an axis parallel to, and movable by the main slide in a plane including, the axis of the face plate, an auxiliary slide mounted on the head for radial movement thereon, means for adjusting and holding in adjusted position said auxiliary slide, a V-block fixed to the auxiliary slide, and a second V-block on the auxiliary slide adjustably spaced from the first, the plane bisecting the angles of the V's being parallel to the path of motion of the auxiliary slide and including the axis of rotation of the head; the fixed V-block having means for engaging a dowel on the fly wheel flange of a crankshaft to register the crankshaft in definite angular relation to the rotatable head; whereby, with a main bearing of a crankshaft clamped between the V-blocks, the auxiliary slide can be shifted to bring the axis of said bearing into alignment with the axes of rotation of the head and face plate, the main slide can thereupon be adjusted to space the axis of the main bearing from the axis of the face plate a distance corresponding to the throw of the crank pin bearings, and the crank pin bearings can be brought successively into alignment with the axis of the face plate, all without releasing the main bearing from the V-blocks.

FRANCIS P. HEALY.

REFERENCES CITED

The following references are of record in the file of this patent:

UNITED STATES PATENTS

| Number | Name | Date |
| --- | --- | --- |
| 643,172 | Tindel et al. | Feb. 13, 1900 |
| 855,320 | Landis | May 28, 1907 |
| 2,357,610 | Ryffe | Sept. 5, 1944 |